United States Patent [19]
Dunton et al.

[11] Patent Number: 5,482,667
[45] Date of Patent: Jan. 9, 1996

[54] EXTRUSION IMPREGNATION COMPRESSION MOLDING PROCESS

[75] Inventors: Thomas P. Dunton, Lebanon Springs, N.Y.; Erich O. Teutsch, Richmond, Mass.

[73] Assignee: General Electric Company, Pittsfield, Mass.

[21] Appl. No.: 106,093

[22] Filed: Aug. 11, 1993

[51] Int. Cl.⁶ ............... B29B 11/16; B29B 15/14; B29C 70/52
[52] U.S. Cl. ............... 264/136; 156/166; 156/180; 264/257
[58] Field of Search ............... 264/134, 135, 264/136, 137, 174, 257, 258, DIG. 65; 156/166, 180

[56] References Cited

U.S. PATENT DOCUMENTS

| | | | |
|---|---|---|---|
| 2,646,380 | 7/1953 | Barlow et al. | 264/135 |
| 2,877,498 | 3/1959 | Schneider | 264/137 |
| 3,530,212 | 9/1970 | Kienle et al. | 264/174 |
| 3,684,645 | 8/1972 | Temple et al. | 428/131 |
| 3,765,998 | 10/1973 | Oswald et al. | 264/324 |
| 3,932,350 | 1/1976 | Yamaguchi et al. | 264/134 |
| 4,213,930 | 7/1980 | Goodrich et al. | 264/137 |
| 4,238,266 | 12/1980 | Steinberg et al. | 156/243 |
| 4,269,884 | 5/1981 | Della Vecchia et al. | 428/131 |
| 4,394,338 | 7/1983 | Fuwa | 264/135 |
| 4,469,543 | 9/1984 | Segal et al. | 156/283 |
| 4,486,373 | 12/1984 | Kurauchi et al. | 264/174 |
| 4,716,072 | 12/1987 | Kim | 428/212 |
| 4,770,834 | 9/1988 | Nakasone et al. | 156/180 |
| 4,859,524 | 8/1989 | Kim et al. | 428/236 |
| 4,882,114 | 11/1989 | Radvan et al. | 264/129 |
| 4,883,552 | 11/1989 | O'Connor et al. | 156/180 |
| 4,938,823 | 7/1990 | Balazek et al. | 156/166 |
| 4,978,360 | 12/1990 | Devanathan | 264/136 |
| 4,983,247 | 1/1991 | Kim | 156/272.2 |
| 5,002,712 | 3/1991 | Goldmann et al. | 264/174 |
| 5,047,198 | 9/1991 | Kim | 264/257 |
| 5,055,242 | 10/1991 | Vane | 264/137 |
| 5,076,872 | 12/1991 | Nakagawa et al. | 156/166 |
| 5,096,645 | 3/1992 | Fink | 264/174 |
| 5,176,775 | 1/1993 | Montsinger | 156/166 |
| 5,207,850 | 5/1993 | Parekh | 264/136 |
| 5,268,050 | 12/1993 | Azari | 156/166 |

FOREIGN PATENT DOCUMENTS

| | | | |
|---|---|---|---|
| 4112532 | 10/1992 | Germany . | |
| 61-229535 | 10/1986 | Japan | 156/166 |

*Primary Examiner*—Jay H. Woo
*Assistant Examiner*—Duane S. Smith

[57] ABSTRACT

This invention is directed to a continuous process for producing a molded thermoplastic fiber reinforced article having a high resin concentration in at least one surface thereof. The finished article may be prepared by compression molding and can have a Class A surface. The continuous process includes coating at least one surface of a heated fiber mat core with a melted first thermoplastic resin, passing the fiber mat core into an extrusion zone wherein a melted second thermoplastic resin is extruded onto at least one surface of the fiber mat core and then molding the fiber mat core and thermoplastic resin into a finished article. The continuous process of this invention provides for fast production of molded finished articles such as roof tile, automobile exterior panels, house siding, etc.

11 Claims, 1 Drawing Sheet

EXTRUSION IMPREGNATION COMPRESSION MOLDING PROCESS

FIELD OF THE INVENTION

The present invention relates to a continuous process for producing a fiber reinforced thermoplastic resin article. The finished article can have a Class A surface, if desired, depending on the finish of the mold surfaces. While a Class A surface does not have a universally accepted definition or specification, one accepted definition is a glossy, smooth and polished surface which should be as smooth as that of a current automobile exterior part made from sheet metal. Another definition is that the visible surface of the article in the finished state is free of exposed glass fibers, flash, sharp edges, visible parting lines, crazing, porosity, hair line cracks, blisters, and obvious repairs.

Briefly, the continuous process of this invention comprises taking a heated fiber mat core, coating at least one surface thereof with a melted first thermoplastic resin, passing the coated fiber mat core through an extrusion zone where in a melted second thermoplastic resin is coated onto at least one surface thereof, and then molding the combination into the finished article. The finished article can have a Class A surface, if desired, depending upon the finish of the mold surface and will have a high concentration of the second thermoplastic resin in the surface or surfaces thereof, depending on whether or not the second thermoplastic resin is extruded on one or both surfaces of the fiber mat core in the extrusion zone.

The continuous process of this invention provides a process for the continuous production of fiber reinforced thermoplastic resin articles that have such uses as automobile exterior panels (fenders, hoods, trunk lids, etc.), roofing tiles, house siding, etc.

BACKGROUND OF THE INVENTION

Producing finished articles that have a high concentration of thermoplastic resin on the surfaces thereof is known in the art as disclosed in U.S. Pat. No. 4,983,247 and also described in other U.S. patents, particularly U.S. Pat. Nos. 4,859,524 and 4,716,072. While these references disclose producing articles of thermoplastic resin and fiber reinforcement and further disclose articles that have a resin rich surface which may be a Class A surface, the references nevertheless disclose essentially a batch process for forming the articles.

U.S. Pat. No. 4,983,247 discloses forming a composite that can have a Class A surface by forming a fiber free layer of a first thermoplastic resin and juxtaposing with a layer at least a portion of a thermoplastic blank comprising a second thermoplastic resin in a fibrous reinforcing material, heating a blank of the article and then compressing together to form the finished article.

DETAILED DESCRIPTION OF THE INVENTION

Figure 1:
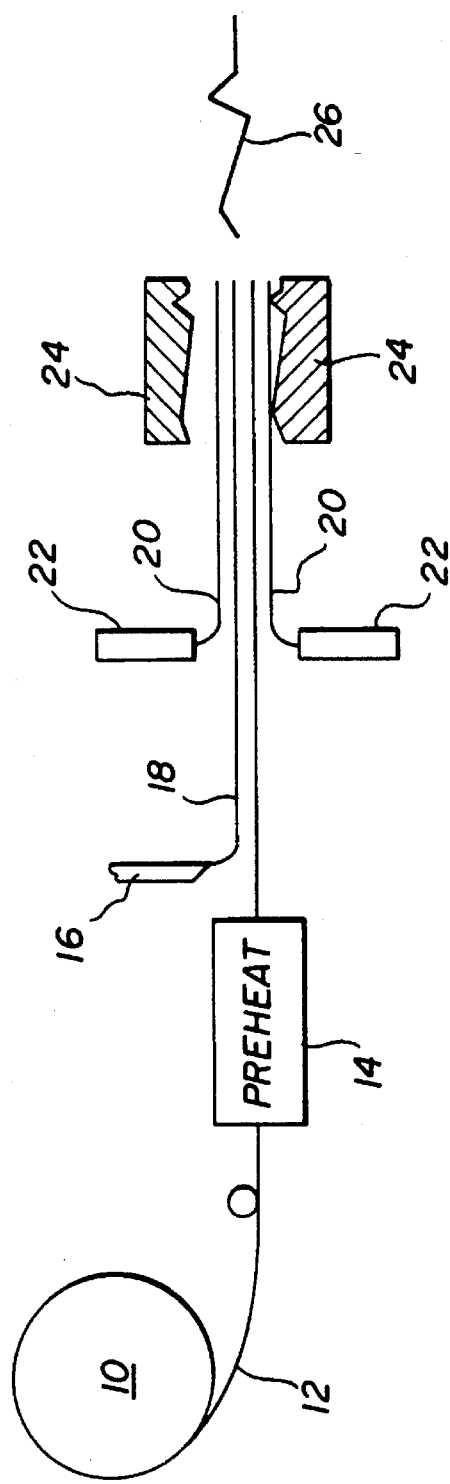
FIG. 1 is a schematic drawing of one embodiment of the process of the invention.

In accordance with the present invention, there is provided a continuous process for producing fiber reinforced thermoplastic resin articles by molding, which finished article can have a Class A surface if desired.

In its broadest scope, the continuous process of this invention comprises passing at least one layer of a fiber mat core into a preheat zone, heating the fiber mat core in the preheat zone to a temperature sufficient to prevent chilling of the surface of the melted first thermoplastic resin when brought into contact with the heated fiber mat core in the coating zone, which temperature is at least about 350° F., passing the preheated fiber mat core to a coating zone wherein a melted first thermoplastic resin is applied to at least one surface of the fiber mat core, passing the first melted thermoplastic resin coated fiber mat core to an extrusion zone wherein a melted second thermoplastic resin is extruded or coated onto the top and/or bottom of the first melted thermoplastic coated fiber mat core, and then passing the combination to a molding zone wherein the combination is molded, preferably by compression molding, into the desired shaped article. The temperature of the mold in the preferred compression molding zone may be substantially below the melt temperature of the thermoplastic resins employed in this process. While the fiber mat core is heated to a temperature of at least about 350° F., it is preferable that the fiber mat core be heated to above the resin processing temperature, which is above the melt or softening temperature of the thermoplatsic resins being employed herein.

In the preheat zone, the fiber mat core is heated to a temperature sufficient to maintain the first thermoplastic resin molten, particularly at the interface of the resin and fiber mat core, when the resin is applied in the coating zone so as not to chill the surface of the molten resin fiber mat core when brought into contact with the fiber mat core. The preheating of the fiber mat core may be through the use of an infrared oven, a hot air oven, an impingement oven, etc. For optimum results, the fiber mat core should be brought up to processing temperature, namely heating the fiber mat core throughout to the desired temperature, which is at least 350° F., depending on the resin being employed.

In the coating zone, a melted first thermoplastic resin is coated or extruded onto the fiber mat core which during molding will impregnate the fiber core. This is commonly referred to as resin "wet-out" of the fibers to provide bonding of the fibers of the fiber mat core. The bonding of the fibers that occurs herein is in addition to the "binder" resin or agent that is used during the manufacture of the fiber mat, wherein a "binder" resin or agent is generally used in light amounts, but yet sufficient to hold the fibers together for the purpose of giving body to the fiber mat for handling purposes. This "binder" resin or agent should be compatable with the thermoplastic resin being employed in the practice of this invention and preferably aides in "wetting-out" of the fibers of the fiber mat core with the thermoplastic resin used in impregnating the fiber mat core. This procedure and process is well known to the fiber mat manufacturers.

In the molding zone, there is sufficient residual heat in the fiber mat to maintain the first thermoplastic resin molten during molding such that the molding pressure will force the molten thermoplastic resin into the fiber mat thereby wetting or coating the fibers thereof. Also, during molding, the second thermoplastic resin extruded or coated on the top and/or bottom of the melted first thermoplastic coated fiber mat core will essentially remain on or at the surface of the fiber mat. The temperature of the mold surface is generally below the melting or softening temperature of the second melted thermoplastic resin applied onto the surfaces, thereby chilling or solidifying the second thermoplastic resin on the surface of the resin impregnated fiber mat core. This results in a finished article having a surface that has a high concentration of thermoplastic resin. Preferably, molding is by compression molding. However, disclosed hereinafter is another molding process referred to as "roll forming" which may, in effect, be considered a form of compression molding.

In the practice of this invention, it may be desirable to employ a low molecular weight or a low viscosity first thermoplastic resin for impregnating the fiber mat core because of the ease of flow of the resin. The second thermoplastic resin applied in the extrusion zone may be of a higher molecular weight or a higher viscosity resin which would minimize penetration of the second thermoplastic resin into the fiber mat core. Also, the use of a higher molecular weight thermoplastic resin in the surface of the finished article so produced by the process of this invention results in a finished article having better mechanical properties, better surface weatherability and may exhibit better chemical resistance.

The surface of the molded article prepared in accordance with this invention can be a Class A surface, if desired, by providing smooth surfaces on the inside of the mold face itself. Alternatively, if a rough or non-glossy or grainy surface is wanted, such as for roof tile, then the inside surfaces of the mold can be so roughened or etched or so prepared as to impart the desired surface characteristics to the surface of the finished article. In fact, the surface of the mold may be dusted with an inorganic or high melting powder in order to obtain a rough or dull or irregular surface. The powder should, preferably, be insoluble in the thermoplastic resin and should not melt at the molding temperature employed. Also, in order to obtain a decorative finish which may be, for example, either rustic or antique in appearance, powdered pigment or a blend of powdered pigment and thermoplastic resin powder may be applied to at least one surface of the combination of fiber mat core and thermoplastic resin having the high concentration of thermoplastic resin at least prior to or during molding. A decorative affect is thus obtained. In any case, the surface of the molded finished article should be free of fibers from the fiber mat core.

Alternatively, in another embodiment of the process of this invention, a "wet-out" roll zone may be employed between the coating zone, where the melted first thermoplastic resin is applied to the preheated fiber mat core, and the extrusion zone where the melted second thermoplastic resin is applied. The "wet-out" roll zone can consist of at least one pair of opposing heated "wet-out" rolls, the surfaces of which are heated to a temperature sufficiently low enough to avoid sticking of the melted thermoplastic resin to the surface of the rolls, but yet high enough to avoid excessive chilling of the thermoplastic resin. Some chilling of the surface interface of the melted resin and the roll surface may occur, but the temperature of the surface of the rolls should not be so low as to cause excessive chilling at the interface of the resin surface and the roll surface, which would tend to lessen the impregnation of the fiber mat core with the first molten thermoplastic resin. Although some momentary chilling of the resin surface may occur, as stated above, the residual heat in the fiber mat core should be sufficient to remelt the chilled surface of the resin, thereby aiding the impregnation of the fiber mat core therewith. The pressure of the rolls on the first melted resin coated fiber mat core and the nip of the rolls should be such as to force the melted thermoplastic resin into the fiber mat core, namely impregnate the fiber mat core, but not so great as to fracture the fibers of the fiber mat core. As stated previously, this is known as "wet-out" of the fibers; thus the term "wet-out" rolls. Also, the speed of the fiber mat core and of the rolls can be so adjusted that excessive chilling would be avoided even if low temperature heated rolls are used.

As stated earlier, alternatively, at least one pair of opposing "wet-out" rolls can be used. However, the number of pairs of rolls used can vary depending on the thickness of the fiber mat core, the speed of the fiber mat layer through the continuous process of this invention and/or the melt viscosities of the thermoplastic resins employed. One could use two or three or more pairs of opposing "wet-out" rolls depending on the above factors.

In addition, if "wet out" rolls are employed, the rolls may be shaping rolls in that the surface of the rolls could be designed and made so as to conform to the desired shape of the final article. This is known as "roll" forming. Thus, the fiber mat core will then take the shape of the contoured rolls as the thermoplastic resin and fiber mat core passes therebetween, as well as the fiber mat core being impregnated with the melted resin applied in the coating zone. Then in the extrusion zone, the second melted thermoplastic resin is extruded or coated onto the surface of the heated preshaped resin impregnated fiber mat, which may then be followed by the compression molding of the preformed fiber mat into the final or finished formed article. However, "roll" forming may be sufficient to form the final article without actually advancing to a molding zone. The "roll" forming would, in effect, be a compressing molding step as well. For example, a channel beam article could be so made continuously or slabs such as plastic roof the or siding for buildings could be continuously so formed by "roll" forming. The surface of such rolls may be polished to provide a glossy surface such as would be wanted for a Class A surface, or the surface of the rolls may have a mat finish as may be desired for roof tile.

The fiber mat employed in the practice of this invention preferably consists of glass fibers of about ¼" to about 2" long and may have a nominal length of about ½". Generally, glass fibers are the preferred fibers but other fibers or combinations of fibers may be employed and used such as carbon fibers, mineral fibers, high temperature organic fibers, etc. The fibers employed in preparing the fiber mat of this invention are high aspect ratio fibers, wherein the ratio of length to diameter or thickness ratio is greater than 1 and preferably 10 or greater. If the end product is to be employed for electrical uses, it may be preferred to use fibrous glass filaments comprised of lime-aluminum borosilicate glass that is relatively soda free. This is known as "E" glass. However, other glasses are useful such as the low soda glass known as "C" glass where electrical properties are not so important. Also useful are the "S" glasses. The glass filaments are made by standard processes, e.g., by steam or air blowing, flame blowing and mechanical pulling. Generally, the preferred method for making glass filaments for plastic reinforcement is the mechanical pulling process. The filament diameters range from about 5 microns (μm) to about 30 microns (μm) and may even be finer, but this is not critical to the present invention.

While chopped glass fibers have been described above, other glass fibers can be used to make up the fiber mat core such as continuous random glass fibers or a combination of chopped glass fibers and continuous random glass fibers. In fact, even continuous parallel glass fibers may be employed herein or any combination thereof with other forms of the glass fibers or other fibers. The preferred fiber mat is one made up of chopped glass fibers as described previously. The glass fibers in the fiber mat core may be essentially fully dispersed glass fibers or may contain bundles of glass fibers or a combination of both, depending on the end use of the article being so formed.

The number of layers of fiber mats employed in the practice of this invention is at least one layer. However, more than one layer may be employed such as two or three or more layers of fiber mat, depending on the desired thickness of the ultimate article being molded. In addition, the thickness of the fiber mat layer can vary depending on the parameters of the end use of the article as stated above.

The thickness of the fiber mat core after it leaves the coating zone is essentially the same thickness as when it leaves the preheat zone. The fiber mat core at this point is porous in that it contains voids or openings in the structure and remains as such until it is molded. Upon molding or "roll" forming of the fiber mat core and thermoplastic resin into the final shape, it may become a non-porous article essentially free of voids or openings. However, the question of the final article being essentially non-porous depends upon the fiber content of the final article to be prepared by the process of this invention. If the fiber content is high, the final article, while being impervious to air or water, would be classified as porous in that it would contain openings or voids within the core of the final article after molding. However the surfaces would be free of voids or openings and would be nonporous. On the other hand, if the fiber content is low, the finished article, including the core, would be essentially non-porous upon molding.

If "wet-out" rolls are employed, the first melted thermoplastic resin coated fiber mat core becomes somewhat compressed as it passes through the nip of the "wet-out" rolls. However, the fiber mat core, as it leaves the "wet out" roll zone expands, commonly known as "lofting", which may be due to the residual heat in the fiber mat and the latent recoil forces within the fibers. As stated previously, the fiber mat core is porous in that it contains voids or openings in the fiber mat core even though it becomes impregnated with the first thermoplastic resin applied to the fiber mat core in the coating zone. Even as the fiber mat layer leaves the extrusion zone where a melted second thermoplastic resin is extruded or coated onto the top and/or bottom of the first melted coated resin fiber mat core, the structure is still porous in that the structure contains pores or voids or openings. Upon molding thereof, the structure may be non-porous depending on the fiber content as stated previously herein.

As discussed previously, the fiber mat core can consist of one or two or more layers of the fiber mat. Regardless of the number of layers of fiber mat employed, the fiber mat core may be coated with the melted first thermoplastic resin on at least one surface thereof, but may be coated on both outer surfaces. If more than one fiber mat layer is employed, the first melted thermoplastic resin may be coated on the outer surfaces, as well as the between surface or surfaces of fiber mat layers. Again, where the melted first thermoplastic resin is deposited depends on the parameters of the process of this invention, the speed of the process, the melt viscosity of the first melted thermoplastic resin used for impregnation the fiber mat and/or the desired shape of the finished article.

The thermoplastic resins that can be used in the present invention may be any of the thermoplastic resins and depends primarily on the end application of the molded part or article. The thermoplastic resins that may be employed in the coating zone and/or in the extrusion zone may be the same or different and may be, for example, an aromatic polycarbonate having an intrinsic viscosity of about at least 0.40 deciliters/gram as measured in methylene chloride at 25° C., polyethylene (PE), polystyrene, copolymers and terepolymers of styrene copolymerized with other monomers such as acryolonitrile, butadiene, methymethacrylate, ethylmethacrylate, ethyl methylmethacrylate, etc., high impact polystyrene which is a polybutadiene with styrene monomer polymerized thereon, polybutylene terephthalate, polyethylene terephthalate, blends of polybutylene terephthalate (PBT) and polyethylene terephthale (PET), polypropylene, polypropylene terephthalate (PPT), poly(1,4 cyclohexanedimethanol) terephthalate, polyetherimide, polyetherimide esters, polyether, polyether ester, polyphenylene ether (PPE), crystalline or amorphous polyamides (PA), blends of polyphenylene ether and styrene polymers such as polystyrene or high impact polystyrene, etc., or blends of any of the above thermoplastic resins. The first thermoplastic resin applied in the coating zone and the second thermoplastic resin applied in the extrusion zone as stated previously may be the same or different resins, may be of the same or different melt viscosities, or may be of the same or different molecular weights. If the thermoplastic resins are to be each an aromatic polycarbonate resin, for example, it is preferred that the first thermoplastic polycarbonate have an intrinsic viscosity of less than about 0.5 dl/g and the second thermoplastic polycarbonate have an intrinsic viscosity of greater than about 0.5 dl/g. Another combination is using, as the melted first thermoplastic resin, a blend of polyphenylene ether and a high impact polystyrene (NORYL® resin sold by General Electric Company), and as the melted second thermoplastic resin an aromatic polycarbonate (LEXAN® 100 resin sold by General Electric Company having an intrinsic viscosity (IV) of about 0.55 deciliters/gram as determined in methylene chloride at 25° C.). Yet another system that can be successfully employed is a combination wherein the first and second melted thermoplastic resin is a blend of an aromatic polycarbonate, polybutylene terephthalate and an impact modifier (XENOY® resin sold by General Electric Company). Various other combinations of resin systems can be employed in the practice of this invention such as those listed below:

| First Resin | Second Resin |
| --- | --- |
| ● Polycarbonate (IV 0.48 dl/gram) | XENOY ® resin |
| ● NORYL ® resin | NORYL ® resin |
| ● VALOX ® 295 resin (polybutylene terephthalate [PBT] IV 0.50 dl/g as determined in a 60:40 phenol/tetrachloroethane at 23°–30° C.) | VALOX ® 315 resin (same, but IV 0.7 dl/g) |
| ● PBT/PET (50 wt. %/50 wt. % IV 0.45 dl/g) | Polycarbonate (IV 0.55 dl/g) |
| ● NORYL ® resin | PPE/PA (70 wt. %/30 wt. %) |
| ● PA | PA |
| ● PET | PET |
| ● PA (6, 6) | PPE/PA (70 wt. %/30 wt. %) |
| ● PPE/PBT | NORYL ® resin |
| ● PPE/PET | NORYL ® resin |
| ● PPE/PET | PPE/PET |
| ● PPE/PET/PBT | NORYL ® resin |
| ● NORYL ® resin | PPE/PET/PBT |

In addition, one employing polyethylene terephthalate (PET) alone that is either the fiber mat core impregnating resin and/or the surface resin, nucleating agents can be employed which enhance the molding of the article of this invention. Polyethylene terephthalate resin is generally a difficult moldable resin, and the use of a nucleating agent enhances the faster crystallization of the resin. The greater the degree of crystallization of the PET, the better are its properties in the molded state such as heat distortion temperature, melting temperature and other properties.

Many other combinations of thermoplastic resin may be employed in the practice of this invention without detracting from the scope or objective of the invention. The compositions of the VALOX®, XENOY®, NORYL®, and LEXAN® resins are as previously described herein.

While it is preferred that the second melted thermoplastic resin applied in the extrusion zone is generally a neat resin in that it contains no fillers or reinforcing agents, such thermoplastic resin employed in the extrusion zone may contain fine particulate fillers or reinforcing agents such as clay, mica, wollastonite, carbon black, calcium carbonate, magnesium carbonate, or other mineral fillers, providing that the filler particles or reinforcing agent particles are substantially smaller in size than the thickness of the second thermoplastic resin being extruded onto the surface of the first thermoplastic resin coating or the impregnated fiber mat core, as it leaves the "wet-out" roll zone as the case may be. This second melted thermoplastic containing fine particles should, preferably, not contain high aspect ratio fillers or reinforcing agents as to protrude from the surface of the finished article.

The molds employed in the present invention are compression molding molds or "roll" forming "molds" as described previously. In the case of the compression molds, the inner surface of the mold may be metal surfaces, or one surface may be metal and the other surface may be a silicone rubber surface or a hard rubber surface or a cross-linked butadiene rubber surface, or it may be a flexible diaphragm surface with a controlled heated hydraulic fluid backing. The molding process with a mold surface other than metal is known as soft surface molding wherein such surface is deformable. This molding technique is being used successfully in the molding field. When using hydraulic fluid backing and a soft silicone rubber surface or flexible diaphragm, the temperature of the hydraulic fluid can be controlled to match the cooling rate of the surface of the article which is against a metal surface whereas the other surface of the article is against the silicone rubber surface. Alternatively, very high cooling rates can be achieved or the temperature of the hydraulic fluid can be changed rapidly which would permit preheating the rubber or soft surface to prevent premature cooling of the resin surface of the article being formed during molding, followed by rapid cooling to minimize cooling/cycle time. It is preferable that full compression of the fiber mat core and resin during molding occur in order to achieve certain optimum mechanical properties of the final article prepared in accordance with this invention.

While it is preferable to extrude or coat the second thermoplastic resin on both surfaces of the fiber mat core in the extrusion zone, just one surface thereof may have thermoplastic resin extruded or coated thereon. This, however, depends on the thickness of the fiber mat core in the final molded article or the thickness of the resin surface versus the thickness of the molded article. It may also depend on the end use or application of the article formed during molding as whether one or both surfaces would have the second thermoplastic resin applied to one or both surfaces of the fiber core in the extrusion zone.

Therefore, in the present invention, it is to be understood by those skilled in the art that various changes may be made in the particular embodiments described above without departing from the spirit and scope of the invention as defined in the appended claims.

DETAILED DESCRIPTION OF THE DRAWINGS

FIG. 1 is a schematic drawing of one embodiment of the process of this invention. In FIG. 1, fiber mat core 12 from roll 10 is continuously fed into preheat oven 14 and heated to a temperature of at least about 350° F., and preferably higher, as indicated previously. The preheated fiber mat core 12 is then fed into resin coater 16, where the first melted thermoplastic resin 18 is deposited onto the moving fiber mat core 12. Fiber mat core 12 and melted resin 18 is then passed into an extruder zone where the second melted thermoplastic resin 20 is extruded through extruder 22 onto moving fiber mat core 12. The fiber mat core 12 with the first melted thermoplastic resin coating 18 and the second melted thermoplastic resin 20 is then fed to compression mold 24 and compression molded into article 26, which can then be trimmed to final part size.

Figure 2:
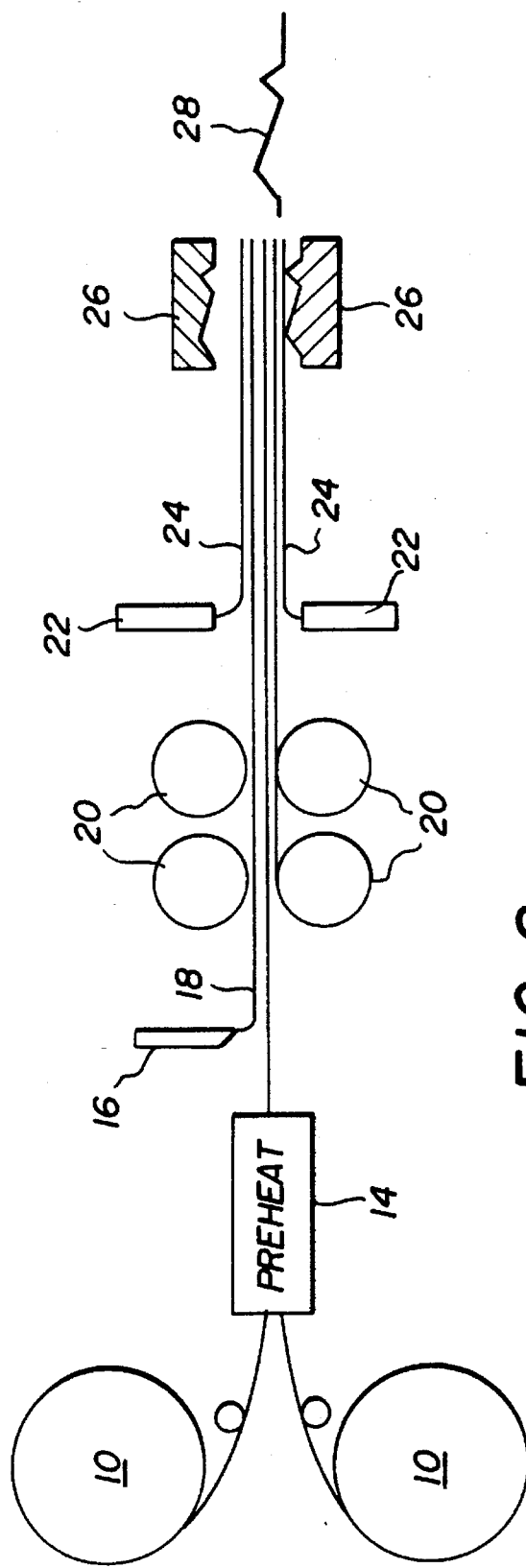
FIG. 2 is a schematic drawing of another embodiment of the process of the invention.

FIG. 2 is a schematic drawing of another embodiment of the process of this invention. In FIG. 2, two layers of fiber mat core 12 from rolls 10 are fed into preheat oven 14, wherein the fiber mat layers are preheated to a temperature of at least about 350° F. or higher, as stated previously. The preheated fiber mat core 12 are then fed to the resin coater 16, where the first melted thermoplastic resin 18 is deposited through extruder 16 onto preheated moving fiber mat core 12. The fiber mat core 12 is coated with melted resin 18 thereon is passed through two sets of heated "wet-out" rolls 20, where melted resin 18 is forced into fiber mat core 12. The impregnated fiber mat core 12 as it leaves the "wet-out" rolls lofts. The lofted fiber mat core 12 is then fed into an extruder zone. In the extruder zone, the second melted thermoplastic resin 24 is extruded through extruders 22 onto the lofted impregnated fiber mat core 12. The resin impregnated fiber mat core impregnated with the first melted thermoplastic resin and with the second melted thermoplastic resin coating 24 on top and bottom thereof is then passed to compression mold 26 and compression molded into article 28.

The above schematic drawings merely represent particular embodiments of the present invention. It is to be understood by those skilled in the art that various changes may be made in the particular embodiments described in the present invention without departing from he spirit and scope of the invention as defined in the appended claims.

What is claimed is:

1. A continuous process for producing a molded thermoplastic resin fiber reinforced article comprising a fiber mat core and thermoplastic resin wherein the surface of the molded article has a high concentration of thermoplastic resin, which process comprises the steps of applying a molten first thermoplastic resin onto at least one surface of a heated fiber mat core, passing the combination to an extrusion zone, applying molten second thermoplastic resin to at least one surface of the heated fiber mat core and molten first thermoplastic resin, passing the combination of the molten first thermoplastic resin, molten second thermoplastic resin and fiber mat core to a molding zone, and molding the heated combination under pressure into a molded thermoplastic resin fiber reinforced article having on at least one surface a high concentration of the second thermoplastic resin wherein prior to said molding, a material selected from the group consisting of powdered pigment and a blend of a powdered pigment and a powdered thermoplastic resin is applied to the surface of the combination of the fiber mat core and molten first and second thermoplastic resin.

2. The process of claim 1 wherein the first molten thermoplastic resin and the second molten thermoplastic resin are the same thermoplastic resin.

3. The process of claim 1 wherein the second thermoplastic resin is extruded onto the top and bottom surfaces of the combination of fiber mat and first molten thermoplastic resin.

4. The process of claim 1 wherein the heated fiber mat core is impregnated with the first molten thermoplastic resin prior to extruding the molten second thermoplastic resin onto said heated fiber mat second thermoplastic resin onto said heated fiber mat core by passing the fiber mat core and first molten thermoplastic resin through the nip of a pair of opposing heated wet-out rolls wherein the pressure of the rolls on the fiber mat core and first molten thermoplastic resin is sufficient to force said first molten thermoplastic resin into the fiber mat core in order to coat the fiber surfaces thereof.

5. The process of claim 1 wherein the temperature of the heated fiber mat is such as to maintain the second thermoplastic resin in the molten state when in the molding zone.

6. The process of claim 1 wherein a material selected from the group consisting of powdered pigment and a blend of a powdered pigment and a powdered thermoplastic resin is applied to the surface of the combination of the fiber mat core and molten first and second thermoplastic resin having the high concentration of the second thermoplastic resin prior to the molding of the said combination.

7. A continuous process for producing a molded thermoplastic resin fiber reinforced article comprising a fiber mat core and thermoplastic resin wherein the surface of the molded article has a high concentration of thermoplastic resin, which process consists essentially of:

passing at least one layer of a fiber mat core into a preheat zone, heating the fiber mat core to a temperature sufficient to maintain the first thermoplastic resin in the molten state, passing the preheated fiber mat core through a resin coating zone wherein the melted first thermoplastic resin is applied to at least one surface of the heated fiber mat core, passing the heated fiber mat core and the first melted thermoplastic resin to an extrusion zone wherein a melted second thermoplastic resin is extruded onto at least one surface of the fiber mat core, passing the heated combination of fiber mat core, first melted thermoplastic resin and second melted thermoplastic resin to a molding zone, and molding the combination under pressure into the molding thermoplastic resin fiber reinforced article wherein at least one surface thereof has a high concentration of the second thermoplastic resin wherein prior to said molding, a material selected from the group consisting of powdered pigment and a blend of a powdered pigment and a powdered thermoplastic resin is applied to the surface of the combination of the fiber mat core and molten first and second thermoplastic resin prior.

8. The process of claim 7 wherein the coating zone, the molten first thermoplastic resin is applied to both top and bottom surfaces of the fiber mat core.

9. The process of claim 7 wherein the fiber mat core having the first molten thermoplastic resin coated onto one surface of the fiber mat core is passed between the nip of at least two opposing heated wet-out rolls, the temperature of the surface of which rolls are such as to avoid sticking of the first molten thermoplastic resin to the surface of the rolls and wherein the pressure of the rolls on the fiber mat core and first molten thermoplastic resin is sufficient to force said thermoplastic resin into the fiber mat core in order to coat the fiber surfaces thereof.

10. The process of claim 9 wherein the fiber core consists of chopped glass fibers of about ⅛" to about 2" in length.

11. A continuous process for producing a molded thermoplastic resin fiber reinforced article comprising a fiber mat core and thermoplastic resin wherein the surface of the molded article has a high concentration of thermoplastic resin, which process comprises the steps of applying a molten first thermoplastic resin onto at least one surface of a heated fiber mat core, passing the combination to an extrusion zone, applying a molten second thermoplastic resin to at least one surface of the heated fiber mat core and molten first thermoplastic resin, said first molten thermoplastic resin and said second molten thermoplastic resin are the same thermoplastic resin, said first molten thermoplastic resin is an aromatic polycarbonate resin having an intrinsic viscosity of less than about 0.5 dl/gram and the second molten thermoplastic resin is an aromatic polycarbonate resin having an intrinsic viscosity of greater than about 0.5 dl/gram, passing the combination of the molten first thermoplastic resin, molten second thermoplastic resin and fiber mat core to a molding zone, and molding the heated combination under pressure into a molded thermoplastic resin fiber reinforced article having on at least one surface a high concentration of the second thermoplastic resin.

* * * * *